US012596277B2

(12) United States Patent
Pan et al.

(10) Patent No.: US 12,596,277 B2
(45) Date of Patent: Apr. 7, 2026

(54) DISPLAY PANEL, DISPLAY DEVICE, AND METHOD FOR MANUFACTURING THE SAME

(71) Applicant: Yungu (Gu'an) Technology Co., Ltd., Langfang (CN)

(72) Inventors: Teng Pan, Langfang (CN); Huanhuan Zhang, Langfang (CN); Yadi Liu, Langfang (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 0 days.

(21) Appl. No.: 19/084,728

(22) Filed: Mar. 19, 2025

(65) Prior Publication Data

US 2025/0216722 A1 Jul. 3, 2025

(30) Foreign Application Priority Data

Mar. 29, 2024 (CN) .......................... 202410375883.8

(51) Int. Cl.
*G02F 1/1335* (2006.01)
*G02F 1/13357* (2006.01)

(52) U.S. Cl.
CPC .. *G02F 1/133614* (2021.01); *G02F 1/133606* (2013.01)

(58) Field of Classification Search
CPC ........... G02F 1/133614; G02F 1/16753; G02F 1/166; G02F 1/1679; G02F 1/15

USPC ........................................................ 362/97.1
See application file for complete search history.

(56) References Cited

U.S. PATENT DOCUMENTS

2022/0293684 A1* 9/2022 Ryu ........................ H10K 59/38
2024/0224763 A1* 7/2024 Sun ....................... H10K 59/122

FOREIGN PATENT DOCUMENTS

CN        109891278 A       6/2019
CN        110911456 A       3/2020

* cited by examiner

*Primary Examiner* — Toan C Ly
(74) *Attorney, Agent, or Firm* — Kilpatrick Townsend & Stockton LLP

(57) ABSTRACT

Embodiments of the present application provide a display panel, a display device, and a method for manufacturing the same. The display panel includes: a supporting substrate; an isolation portion disposed on one side of the supporting substrate, the isolation portion defining openings; a filter layer including a filter unit located in each of the openings; a light conversion layer including a light conversion unit disposed in each of the openings and located on a side of the filter unit away from the supporting substrate; and a light-shielding portion disposed on a side of the isolation portion away from the supporting substrate. The light-shielding portion prevents light from the light conversion unit from being emitted toward the isolation portion, thereby reducing light crosstalk.

20 Claims, 6 Drawing Sheets

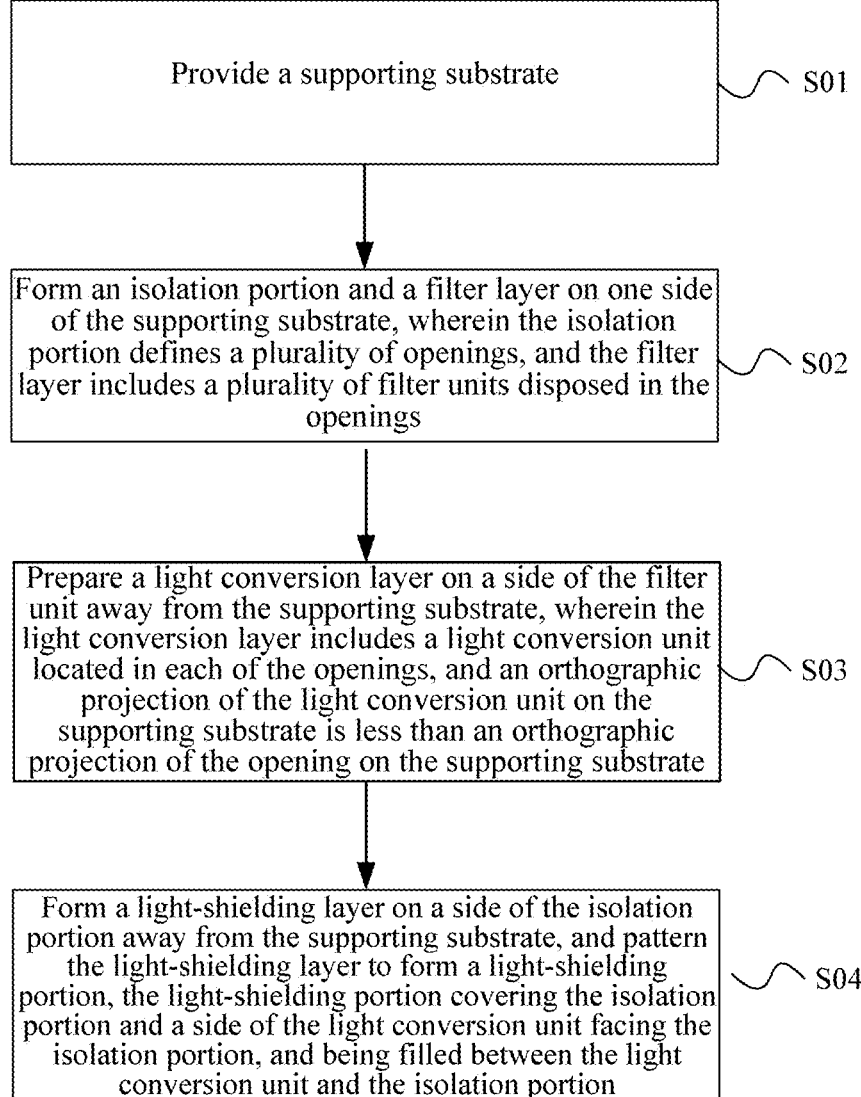

Provide a supporting substrate    S01

Form an isolation portion and a filter layer on one side of the supporting substrate, wherein the isolation portion defines a plurality of openings, and the filter layer includes a plurality of filter units disposed in the openings    S02

Prepare a light conversion layer on a side of the filter unit away from the supporting substrate, wherein the light conversion layer includes a light conversion unit located in each of the openings, and an orthographic projection of the light conversion unit on the supporting substrate is less than an orthographic projection of the opening on the supporting substrate    S03

Form a light-shielding layer on a side of the isolation portion away from the supporting substrate, and pattern the light-shielding layer to form a light-shielding portion, the light-shielding portion covering the isolation portion and a side of the light conversion unit facing the isolation portion, and being filled between the light conversion unit and the isolation portion    S04

Figure 9

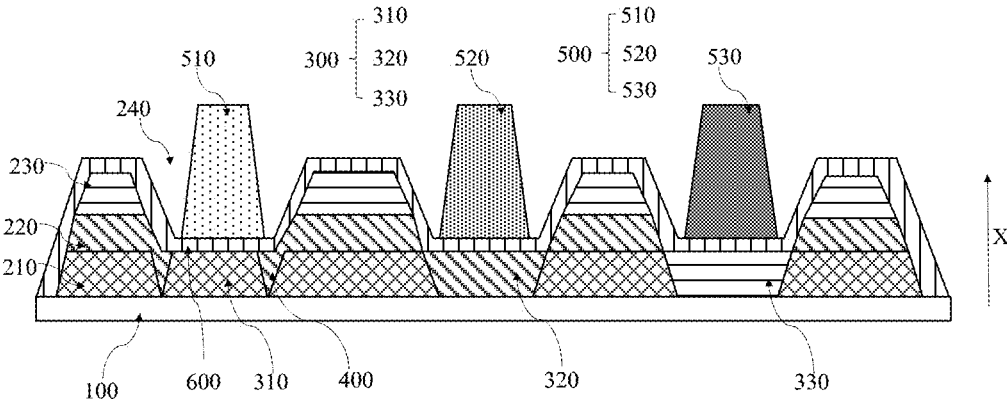

Figure 10

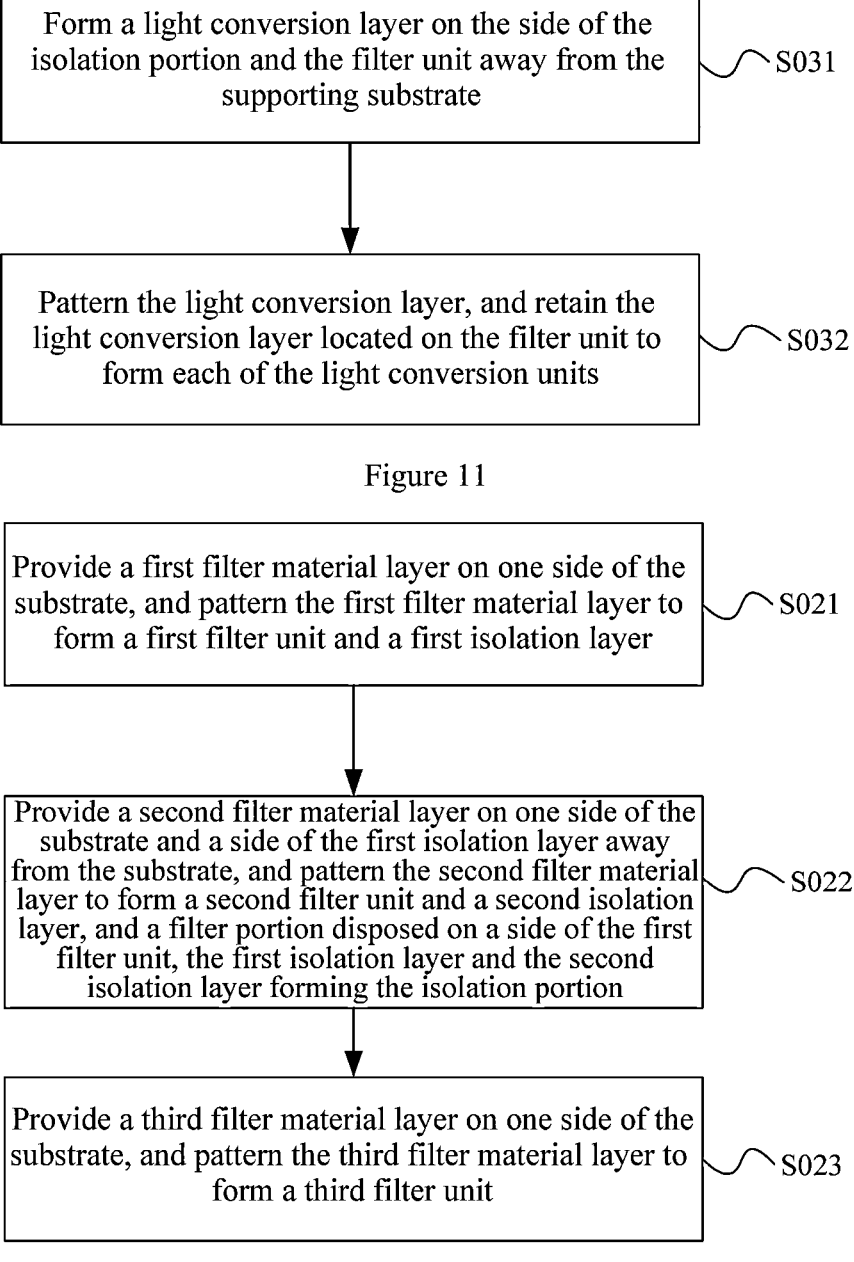

Form a light conversion layer on the side of the isolation portion and the filter unit away from the supporting substrate ⟶ S031

Pattern the light conversion layer, and retain the light conversion layer located on the filter unit to form each of the light conversion units ⟶ S032

Figure 11

Provide a first filter material layer on one side of the substrate, and pattern the first filter material layer to form a first filter unit and a first isolation layer ⟶ S021

Provide a second filter material layer on one side of the substrate and a side of the first isolation layer away from the substrate, and pattern the second filter material layer to form a second filter unit and a second isolation layer, and a filter portion disposed on a side of the first filter unit, the first isolation layer and the second isolation layer forming the isolation portion ⟶ S022

Provide a third filter material layer on one side of the substrate, and pattern the third filter material layer to form a third filter unit ⟶ S023

DISPLAY PANEL, DISPLAY DEVICE, AND METHOD FOR MANUFACTURING THE SAME

CROSS-REFERENCE TO RELATED APPLICATIONS

The present application claims priority to Chinese Patent Application No. 202410375883.8, entitled "DISPLAY PANEL, DISPLAY DEVICE, AND METHOD FOR MANUFACTURING THE SAME" and filed on Mar. 29, 2024, the entire contents of which are incorporated herein by reference.

FIELD

The present application relates to the field of display equipment, and particularly to a display panel, a display device, and a method for manufacturing a display panel.

BACKGROUND ART

Quantum dot (QD) materials have the advantages of high luminescence color purity, adjustable emission wavelength, and material stability, etc., have significant advantages in the field of high color gamut display, and can be used as a quantum dot color conversion layer. When combined with a fixed light source, quantum dots in the quantum dot color conversion layer are excited by incident light, thus emitting light with a longer wavelength than the wavelength of the incident light, but the process performance of display products currently using the quantum dot color conversion layer needs to be improved.

SUMMARY OF THE DISCLOSURE

Embodiments of the present application provide a display panel, a display device and a method for manufacturing a display panel, with a view to improving the process performance of the display panel.

An embodiment of the present application provides a display panel, including: a supporting substrate; an isolation portion disposed on one side of the supporting substrate, the isolation portion defining openings; a filter layer including a filter unit located in each of the openings; a light conversion layer including a light conversion unit disposed in each of the openings and located on a side of the filter unit away from the supporting substrate; and a light-shielding portion disposed on a side of the isolation portion away from the supporting substrate, the light-shielding portion also extending to cover at least part of a side wall of the side of the light conversion unit facing the isolation portion.

An embodiment of the present application further provides a display panel, including: a light-emitting substrate; a light conversion layer disposed on one side of the light-emitting substrate, the light conversion layer including light conversion units arranged at intervals; an isolation portion disposed on one side of the light-emitting substrate, the isolation portion defining openings, and each of the light conversion units being located in each of the openings; a light-shielding portion disposed on a side of the isolation portion facing the light-emitting substrate, the light-shielding portion also extending to cover at least part of a side wall of the light conversion unit facing the isolation portion; and a filter layer including a filter unit located in each of the openings, the filter unit being disposed on a side of the light conversion layer away from the light-emitting substrate.

An embodiment of the present application provides a display device, including a display panel according to any one of the above-described embodiments.

An embodiment of the present application provides a method for manufacturing a display panel. The method includes:

providing a supporting substrate;

forming an isolation portion and a filter layer on one side of the supporting substrate, in which the isolation portion defines openings, and the filter layer includes filter units disposed in the openings;

preparing a light conversion layer on a side of the filter unit away from the supporting substrate, in which the light conversion layer includes a light conversion unit located in each of the openings, and an orthographic projection of the light conversion unit on the supporting substrate is less than an orthographic projection of the opening on the supporting substrate; and forming a light-shielding layer on a side of the isolation portion away from the supporting substrate, and patterning the light-shielding layer to form a light-shielding portion, the light-shielding portion covering the isolation portion and a side of the light conversion unit facing the isolation portion, and being filled between the light conversion unit and the isolation portion.

In this embodiment, the isolation portion defines the openings, and the filter layer includes the filter unit located in the opening to transmit light in a certain wavelength range and block light in other wavelength ranges, thus achieving a filtering effect. The isolation portion is made of the same material as at least some of the filter units, and the isolation portion can have a filtering effect, achieving the effect of blocking light in a certain wavelength range. The isolation portion is made of the same material as at least some of the filter units, and the isolation portion can be formed simultaneously when the filter unit is formed, thereby simplifying the manufacturing process and improving the process performance of the display panel.

The light conversion layer includes light conversion units, where each light conversion unit is disposed on the side of the filter unit away from the supporting substrate, and the light is converted into light in a specific wavelength range by the light conversion unit and then emitted by the filter unit.

The light-shielding portion is configured to prevent the light converted by the light conversion unit from being emitted toward the isolation portion, and more light is converted by the light conversion unit and then emitted in the thickness direction of the supporting substrate, thereby reducing light crosstalk and thus facilitating improvement of the utilization rate of light. In addition, the light-shielding portion is also configured to reduce light passing through the isolation portion from the side of the isolation portion away from the supporting substrate, thereby improving an optical isolation effect.

BRIEF DESCRIPTION OF THE DRAWINGS

By reading the following detailed description made with reference to the drawings for non-limiting embodiments, the other embodiments of the present application will become more apparent, in which the same or similar features are denoted by the same or similar reference numerals.

FIG. 9 is a flowchart of a method for manufacturing a display panel according to an embodiment of the present application;

FIG. 10 is a structural schematic diagram of a further display panel according to an embodiment of the present application;

FIG. 11 is a flowchart of a method for manufacturing another display panel according to an embodiment of the present application;

FIG. 12 is a flowchart of a method for manufacturing a further display panel according to an embodiment of the present application;

Figure 1:
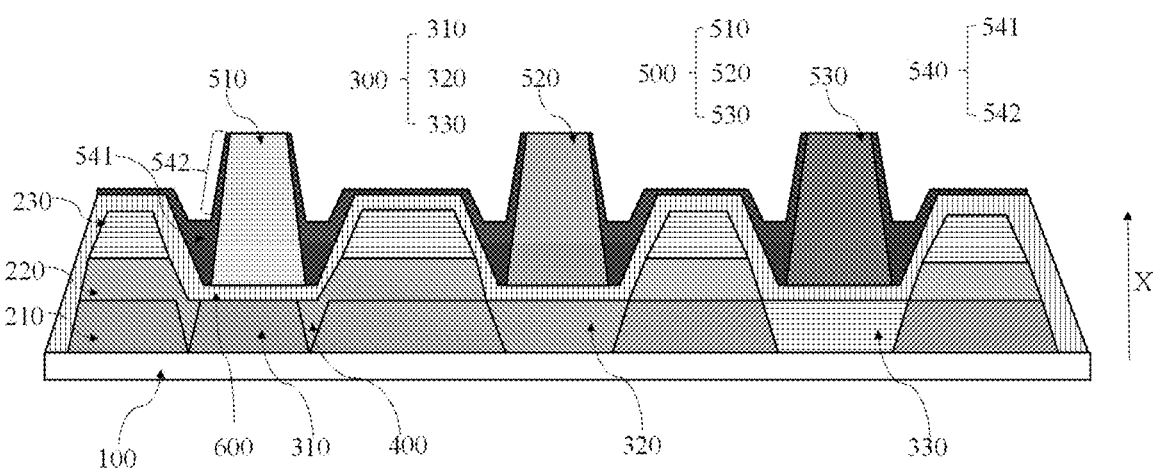
FIG. 1 is a structural schematic diagram of a display panel according to an embodiment of the present application.

List of reference signs: 100. Supporting substrate; 200. Isolation portion; 201. First opening; 202. Second opening; 203. Third opening; 210. First isolation layer; 220. Second isolation layer; 230. Third isolation layer; 240. Opening; 300. Filter layer; 310. First filter unit; 320. Second filter unit; 330. Third filter unit; 400. Filter portion; 500. Light conversion unit; 510. Red light conversion unit; 520. Green light conversion unit; 530. Blue light conversion unit; 540. Light-shielding portion; 541. First segment; 542. Second segment; 600. Encapsulation layer; 700. Light-emitting substrate; 800. Adhesive layer; X. Thickness direction.

DETAILED DESCRIPTION OF EMBODIMENTS

The features and exemplary embodiments of the present application in various embodiments will be described in detail below. In the following detailed description, many specific details are set forth to comprehensively understand the present application. However, it will be very apparent that the present application may be implemented without some of these specific details. The following description of the embodiments are merely to provide a better understanding for the present application by illustrating examples of the present application. In the drawings and the following description, at least part of known structures and techniques are not shown to avoid unnecessary ambiguousness of the present application; and for the ease of clarity, the dimensions of part of the structure may be enlarged. In addition, the features, structures or characteristics described below may be combined, in any suitable manner, in one or more embodiments.

In the description of the present application, it should be noted that "a plurality of" means two or more, unless otherwise specified. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. Moreover, the terms such as "first" and "second" are merely used for the illustrative purpose, and should not be construed as indicating or implying the relative importance.

The orientation terms used in the following description all indicate directions shown in the accompanying drawings, and do not limit the specific structure of the embodiment of the present application. In the description of the present application, it should also be noted that unless otherwise explicitly specified and defined, the terms "mounting" and "connection" should be understood in a broad sense, for example, they may be a fixed connection, a detachable connection, or an integrated connection, and may be a direct connection, or an indirect connection. The specific meanings of the terms mentioned above in the present application can be construed according to specific circumstances.

As shown in FIG. 1, a display panel according to an embodiment of the present application includes: a supporting substrate 100, an isolation portion 200, a filter layer 300, a light conversion layer and a light-shielding portion 540, where the isolation portion 200 is disposed on one side of the supporting substrate 100, and the isolation portion 200 defines openings 240; the filter layer 300 includes a filter unit located in each of the openings 240, and the light conversion layer includes a light conversion unit 500 disposed in each of the openings 240 and located on a side of the filter unit away from the supporting substrate 100; and the light-shielding portion 540 is disposed on a side of the isolation portion 200 away from the supporting substrate 100, and the light-shielding portion 540 also extends to cover at least part of a side wall of a side of the light conversion unit 500 facing the isolation portion 200.

In this embodiment, the isolation portion 200 defines the openings 240, and the filter layer 300 includes the filter units located in the openings 240 to transmit light in a certain wavelength range and block light in other wavelength ranges, thus achieving a filtering effect. The isolation portion 200 is made of the same material as at least some of the filter units, and the isolation portion 200 can have a filtering effect, achieving the effect of blocking light in a certain wavelength range.

The isolation portion 200 includes the same material as at least some of the filter units, i.e., the isolation portion 200 is made of the same material as at least some of the filter units, and the isolation portion 200 can be formed simultaneously when the filter unit is formed, and the manufacturing process can be simplified, and the process performance of the display panel can be improved.

The light conversion layer includes light conversion units 500, where each light conversion unit 500 is disposed on the side of the filter unit away from the supporting substrate 100, and the light is converted into the light in a specific wavelength range by the light conversion units 500 and then emitted by the filter units.

The light-shielding portion 540 is configured to prevent the light converted by the light conversion units 500 from being emitted toward the isolation portion 200, and more light is converted by the light conversion units 500 and then emitted in a direction close to the supporting substrate 100, thereby reducing light crosstalk and thus facilitating improvement of the utilization rate of light. In addition, the light-shielding portion 540 is also configured to reduce light passing through the isolation portion 200 from the side of the isolation portion 200 away from the supporting substrate 100, thereby improving an optical isolation effect.

In one embodiment, the light conversion unit 500 can convert light that is incident on the filter unit in a wavelength range that is at least partially the same as the wavelength range of light that the filter unit allows to pass through.

As shown in FIG. 1, in some embodiments, a cross-sectional area of the light conversion unit 500 remains constant or gradually decreases in a direction away from the supporting substrate 100.

In these embodiments, the cross-sectional area of the light conversion unit 500 gradually decreases in the direction away from the supporting substrate 100, and a production space can be made for the production of the light-shielding portion 540. In one embodiment, each light conversion unit 500 is formed by a photolithography process. Since the cross-sectional area of the light conversion unit 500 gradually decreases in the direction away from the supporting substrate 100, the entire light conversion layer can be produced by patterned photolithography.

As shown in FIG. 1, in some embodiments, orthographic projections of the light conversion unit 500 and the opening 240 on the supporting substrate 100 at least partially overlap with each other, and the orthographic projection of the light conversion unit 500 on the supporting substrate 100 is located within the orthographic projection of a corresponding the opening 240 on the supporting substrate 100.

In these embodiments, the orthographic projection of the light conversion unit 500 on the supporting substrate 100 is less than or equal to the orthographic projection of the opening 240 on the supporting substrate 100, creating a gap between the light conversion unit 500 and the isolation portion 200 to arrange the light-shielding portion 540, thus improving crosstalk prevention between the light conversion units 500.

In one embodiment, as shown in FIG. 1, in a direction perpendicular to a thickness direction X of the supporting substrate 100, a first gap is provided between the light conversion unit 500 and the isolation portion 200, the light-shielding portion 540 filling the first gap.

The first gap is provided between the light conversion unit 500 and the isolation portion 200 to be filled with a light-shielding material to form the light-shielding portion 540, and the light-shielding portion 540 is configured to prevent the light converted by the light conversion unit 500 from being emitted in the direction perpendicular to the thickness direction X of the supporting substrate 100, and more light is converted by the light conversion unit 500 and then emitted in the thickness direction X of the supporting substrate 100, which facilitates improvement of the utilization rate of light.

In one embodiment, as shown in FIG. 1, the light-shielding portion 540 also covers an inner wall surface of a side of the isolation portion 200 facing the light conversion unit 500. This increases the light-shielding effect of the isolation portions.

In one embodiment, as shown in FIG. 1, an encapsulation layer 600 is provided between the light conversion layer and the filter layer 300, and after the filter layer 300 is formed, the filter layer 300 is encapsulated on a side of the filter layer 300 away from the supporting substrate 100 to fix the position of each filter unit.

As shown in FIG. 1, in some embodiments, a spacing between the side of the isolation portion 200 away from the supporting substrate 100 and the supporting substrate 100 is greater than a spacing between the side of the filter unit away from the supporting substrate 100 and the supporting substrate 100, and a spacing between a side of the light conversion unit 500 away from the supporting substrate 100 and the supporting substrate 100 is greater than the spacing between the side of the isolation portion 200 away from the supporting substrate 100 and the supporting substrate 100. The light-shielding portion 540 includes a first segment 541 and a second segment 542, the first segment 541 being filled between the isolation portion 200 and the light conversion unit 500, the second segment 542 being disposed on a side of the first segment 541 away from the supporting substrate 100, and the second segment 542 also covering at least part of the side wall of the side of the light conversion unit 500 facing the isolation portion 200.

In order to ensure the conversion efficiency of the light conversion unit 500, the height of the light conversion unit 500 in the thickness direction X of the supporting substrate 100 is relatively high, and in the process of forming the light-shielding portion 540, the light-shielding portion 540 at least covers the side of the light conversion unit 500 facing the isolation portion 200. A higher height of the light-shielding portion 540 means a greater difficulty of the process, making it challenging to guarantee an improved yield.

In these embodiments, in the thickness direction X, the isolation portion 200 protrudes from the side of the filter unit away from the supporting substrate 100, and the light conversion unit 500 is located in the opening 240 and protrudes from the side of the isolation portion 200 away from the supporting substrate 100. A pit structure, in which the first segment 541 of the light-shielding portion 540 is formed, is formed between the light conversion unit 500 and the isolation portion 200, that is, the first segment 541 is located between the isolation portion 200 and the light conversion unit 500, the first segment 541 is fixed and surrounded by the pit structure, and the second segment 542 is formed on the side of the first segment 541 away from the supporting substrate 100, which facilitates improving the product yield. The second segment 542 covers at least part of the side wall of the side of the light conversion unit 500 facing the isolation portion 200, preventing light crosstalk between the light conversion units 500.

In one embodiment, as shown in FIG. 1, a side of the second segment 542 away from the supporting substrate 100 is flush with the side of the light conversion unit 500 away from the supporting substrate 100, that is, the distance between the side of the second segment 542 away from the supporting substrate 100 and the supporting substrate 100 is equal to the distance between the side of the light conversion unit 500 away from the supporting substrate 100 and the supporting substrate 100, thus preventing the light of the light conversion unit 500 from being emitted in the direction perpendicular to the thickness direction of the supporting substrate 100.

Figure 2:
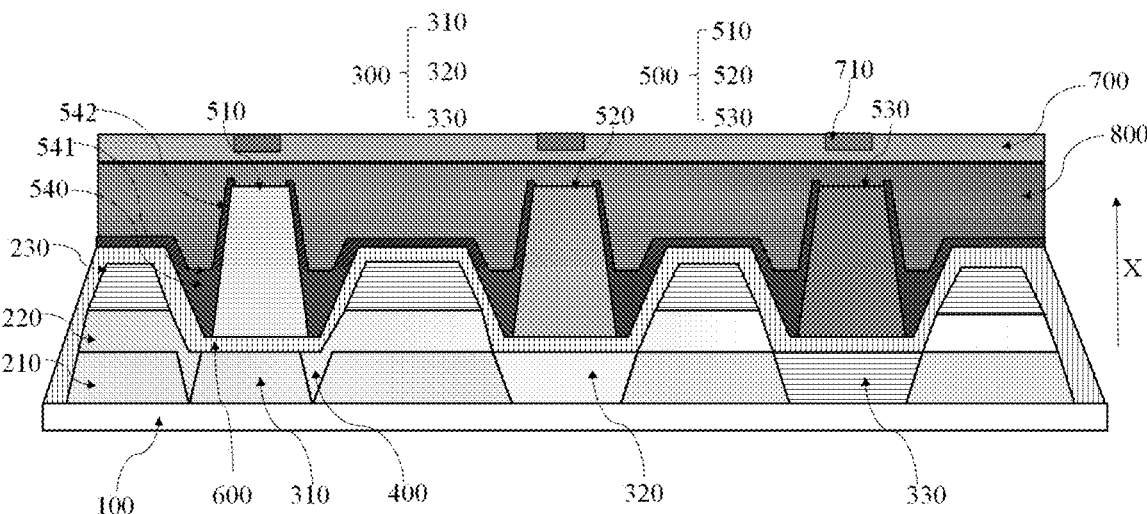
FIG. 2 is a structural schematic diagram of another display panel according to an embodiment of the present application.

In one embodiment, as shown in FIG. 2, an end of the second segment 542 away from the supporting substrate 100 partially overlaps an end of the light conversion unit 500 away from the filter unit, and the end of the second segment 542 away from the supporting substrate 100 overlapping part of the end of the light conversion unit 500 away from the filter unit increases a coupling force between the second segment 542 and the light conversion unit 500, which helps to reduce the probability that the second segment 542 disengages from the light conversion unit 500.

In one embodiment, as shown in FIG. 2, a portion of the second segment 542 on the side of the light conversion unit 500 away from the supporting substrate 100 has a smaller orthographic projection area on the supporting substrate 100 than the side of the light conversion unit 500 away from the supporting substrate 100. This prevents the second segment 542 from blocking the side of the light conversion unit 500 away from the supporting substrate 100.

Figure 3:
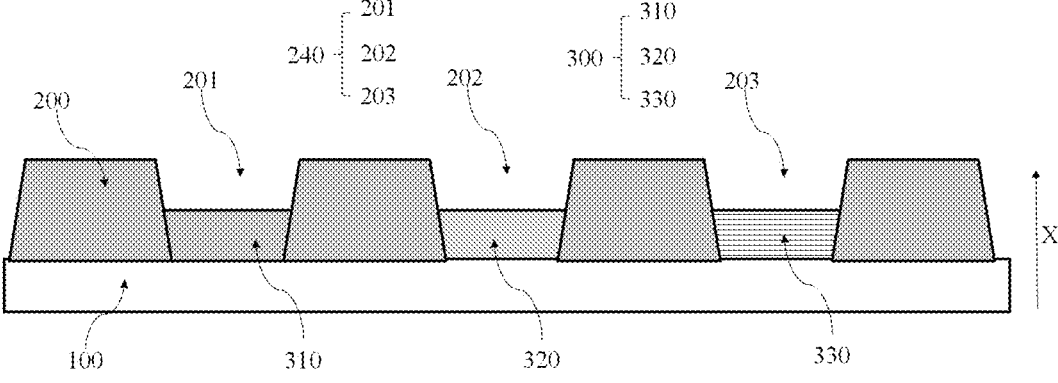
FIG. 3 is a structural schematic diagram of a further display panel according to an embodiment of the present application.

As shown in FIG. 3, in some embodiments, the openings 240 include a first opening 201, a second opening 202 and a third opening 203. The filter units include a first filter unit 310, a second filter unit 320 and a third filter unit 330, the first filter unit 310 being disposed in the first opening 201, the second filter unit 320 being disposed in the second opening 202, and the third filter unit 330 being disposed in the third opening 203. The isolation portion 200 is made of the same material as at least one of the first filter unit 310, the second filter unit 320 and the third filter unit 330.

In these embodiments, the first filter unit 310, the second filter unit 320 and the third filter unit 330 are made of different materials and the first filter unit 310, the second filter unit 320 and the third filter unit 330 are capable of filtering at least partially different wavelength ranges of light, and the first filter unit 310, the second filter unit 320 and the third filter unit 330 are capable of transmitting light of different colors. In one embodiment, the first filter unit 310, the second filter unit 320 and the third filter unit 330 are capable of filtering light having different or at least partially different wavelength ranges.

The isolation portion 200 is made of the same material as at least one of the first filter unit 310, the second filter unit 320 and the third filter unit 330, for example, when the isolation portion 200 is made of the same material as the first filter unit 310, the isolation portion 200 is capable of filtering light in the same wavelength range as that filtered by the first filter unit 310. In one embodiment, when the isolation portion 200 is made of the same material as the first filter unit 310 and the second filter unit 320, the isolation portion 200 is capable of filtering light in the same wavelength range as that filtered by the first filter unit 310 and the second filter unit 320. When the isolation portion 200 is made of the same material as at least one of the first filter unit 310, the second filter unit 320 and the third filter unit 330, the isolation portion 200 can have a filtering function, and achieve the effect of blocking light in a certain wavelength range. Also, the isolation portion 200 and at least one of the first filter unit 310, the second filter unit 320 and the third filter unit 330 can be prepared in the same process step, and the manufacturing process can be simplified, and the process performance of the display panel can be improved.

It should be understood that, for example, when the isolation portion 200 is made of the same material as the first filter unit 310, the first filter unit 310 and the isolation portion 200 may be prepared in the same process step. For example, when the isolation portion 200 is made of the same material as the first filter unit 310 and the second filter unit 320, the first filter unit 310 and the second filter unit 320 may be prepared in the same process step as the isolation portion 200, and the manufacturing process can be simplified, and the manufacturing costs can be saved.

As shown in FIG. 3, in some embodiments, the first filter unit 310, the second filter unit 320, and the third filter unit 330 have the same orthographic projection area on the supporting substrate 100.

In these embodiments, the first filter unit 310, the second filter unit 320 and the third filter unit 330 have the same orthographic projection area on the supporting substrate 100, that is, the same dimension in a direction perpendicular to the thickness direction X of the display panel, and the first filter unit 310, the second filter unit 320 and the third filter unit 330 have the same emission range, which enhances the display uniformity of the display panel.

Figure 4:
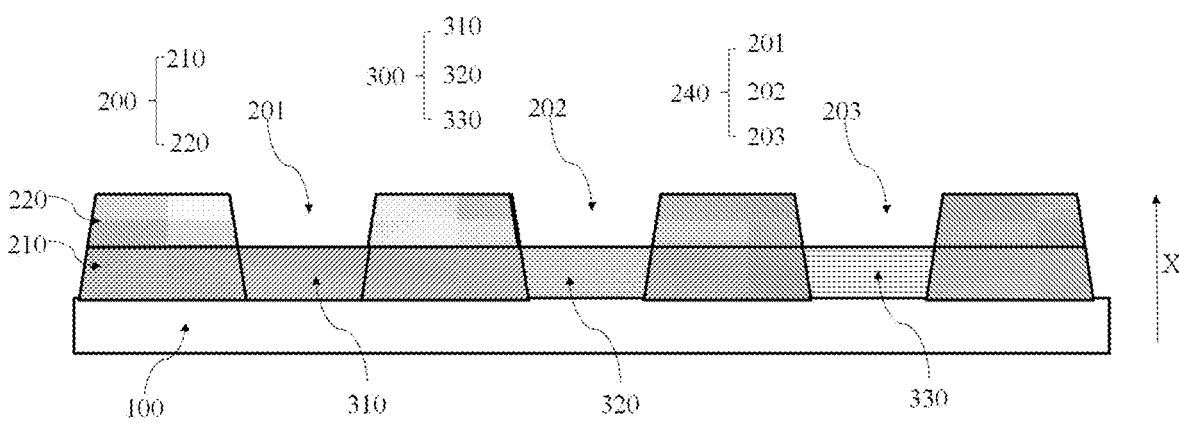
FIG. 4 is a structural schematic diagram of a further display panel according to an embodiment of the present application.
Figure 5:
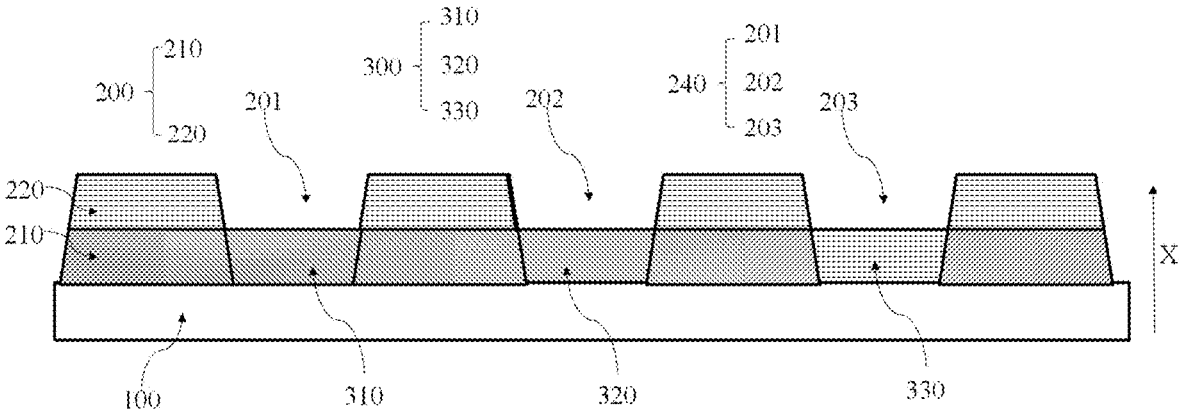
FIG. 5 is a structural schematic diagram of a further display panel according to an embodiment of the present application.

As shown in FIGS. 4 and 5, in some embodiments, the isolation portion 200 includes a first isolation layer 210 and a second isolation layer 220 arranged in a stacked manner, where the first isolation layer 210 is made of the same material as one of the first filter unit 310, the second filter unit 320 and the third filter unit 330, and the second isolation layer 220 is made of the same material as the others of the first filter unit 310, the second filter unit 320 and the third filter unit 330.

In these embodiments, the first isolation layer 210 is made of the same material as one of the first filter unit 310, the second filter unit 320 and the third filter unit 330, and the first isolation layer 210 is capable of filtering light in the same wavelength range as that filtered by the one of the first filter unit 310, the second filter unit 320 and the third filter unit 330, and the second isolation layer 220 is made of the same material as the others of the first filter unit 310, the second filter unit 320 and the third filter unit 330. In one embodiment, the first isolation layer 210 is made of a different material than the second isolation layer 220, and the first isolation layer 210 and the second isolation layer 220 are arranged in a stacked manner and the first isolation layer 210 is made of a different material than the second isolation layer 220, and the isolation portion 200 is capable of filtering light in the same wavelength range as that filtered by two of the first filter unit 310, the second filter unit 320 and the third filter unit 330.

In one embodiment, the first isolation layer 210 and the second isolation layer 220 are stacked in the thickness direction X of the supporting substrate 100, the first isolation layer 210 and the second isolation layer 220 extend in a direction perpendicular to the thickness direction X, and the light is filtered through the first isolation layer 210 and the second isolation layer 220, thus achieving a filtering effect.

For example, the first isolation layer 210 is made of the same material as the first filter unit 310, and the second isolation layer 220 is made of the same material as the second filter unit 320 or the third filter unit 330. When the first filter unit 310 is prepared, the material in an area where the first isolation layer 210 is located may be retained to form the first isolation layer 210, and when the second filter unit 320 or the third filter unit 330 is prepared, the material in an area where the second isolation layer 220 is located may be retained to form the second isolation layer 220. In other embodiments, the first isolation layer 210 is made of the same material as the second filter unit 320, and when the second filter unit 320 is prepared, the material in the area where the first isolation layer 210 is located may be retained to form the first isolation layer 210, and when the first filter unit 310 or the third filter unit 330 is prepared, the material in the area where the second isolation layer 220 is located may be retained to form the second isolation layer 220.

Figure 6:
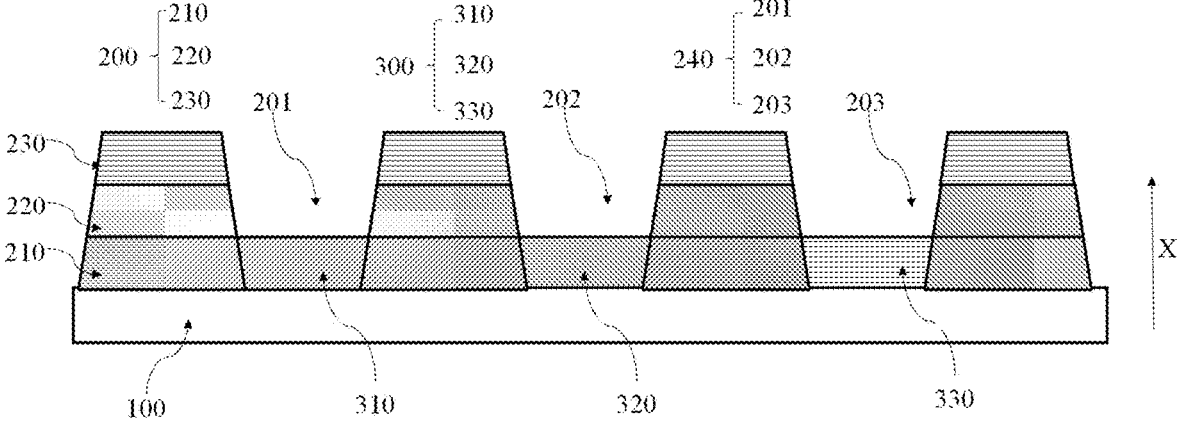
FIG. 6 is a structural schematic diagram of a further display panel according to an embodiment of the present application.

As shown in FIG. 6, in some embodiments, the isolation portion 200 further includes a third isolation layer 230, the first isolation layer 210, the second isolation layer 220 and the third isolation layer 230 are arranged in a stacked manner, the first isolation layer 210 is made of the same material as the first filter unit 310, the second isolation layer 220 is made of the same material as the second filter unit 320, and the third isolation layer 230 is made of the same material as the third filter unit 330.

In these embodiments, the first isolation layer 210 is made of the same material as the first filter unit 310, and the first isolation layer 210 is capable of filtering light in the same wavelength range as that filtered by the first filter unit 310. The second isolation layer 220 is made of the same material as the second filter unit 320, and the second isolation layer 220 is capable of filtering light in the same wavelength range as that filtered by the second filter unit 320. The third isolation layer 230 is made of the same material as the third filter unit 330, and the third isolation layer 230 is capable of filtering light in the same wavelength range as that filtered by the third filter unit 330. The first isolation layer 210, the second isolation layer 220, and the third isolation layer 230 are arranged in a stacked manner and the isolation portion 200 is capable of filtering light in the same range as that filtered by the first filter unit 310, the second filter unit 320 and the third filter unit 330.

In one embodiment, as shown in FIG. 6, the first filter unit 310 is a red filter unit, the second filter unit 320 is a green filter unit, and the third filter unit 330 is a blue filter unit. The red filter unit is capable of transmitting red light in a specific wavelength range and filtering light in a wavelength range other than red light in a specific wavelength range. The green filter unit is capable of transmitting green light in a specific wavelength range and filtering light in a wavelength range other than green light in a specific wavelength range. The blue filter unit is capable of transmitting blue light in a specific wavelength range and filtering light in a wavelength range other than blue light in a specific wavelength range.

The first isolation layer 210 is made of the same material as the red filter unit, the second isolation layer 220 is made of the same material as the green filter unit, the third isolation layer 230 is made of the same material as the blue filter unit, and the first isolation layer 210, the second isolation layer 220 and the third isolation layer 230 are stacked to filter most of visible light, thereby isolating the openings 240 from each other and avoiding light crosstalk in the openings 240.

Figure 7:
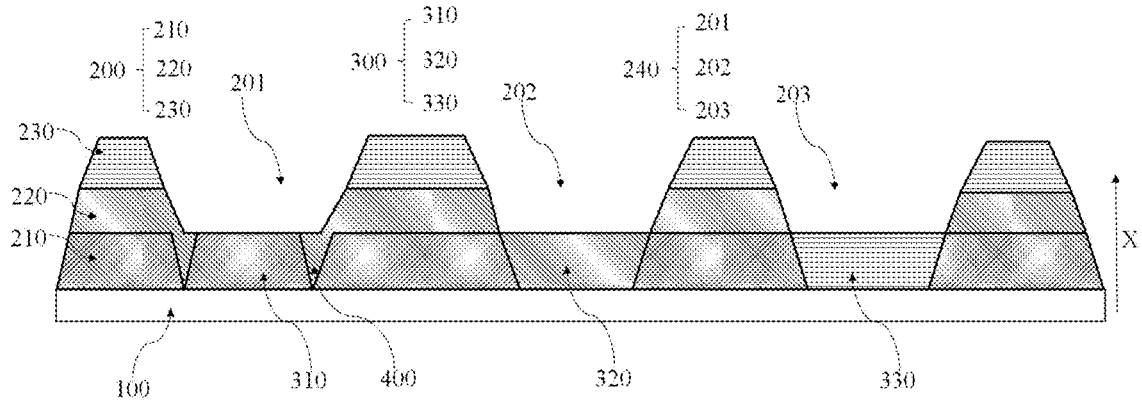
FIG. 7 is a structural schematic diagram of a further display panel according to an embodiment of the present application.

As shown in FIG. 7, in some embodiments, the first isolation layer 210, the second isolation layer 220 and the third isolation layer 230 are sequentially arranged in the direction away from the supporting substrate 100, the first filter unit 310 has a second gap from an inner wall surface of the isolation portion 200 facing the first opening 201, and a filter portion 400 is provided in the second gap.

In these embodiments, the first isolation layer 210 in the isolation portion 200 is located on the side closest to the supporting substrate 100, and the first isolation layer 210 is made of the same material as the first filter unit 310. In the manufacturing process of the display panel, the first filter unit 310 material is provided in the entire layer on the side of the supporting substrate 100, the first filter unit 310 material is patterned to form the first filter unit 310 and the first isolation layer 210 at a time, and it should be understood that the first filter unit 310 and the first isolation layer 210 are arranged in the same layer. The first filter unit 310 has the second gap from the inner wall surface of the isolation portion 200 facing the first opening 201, and the filter portion 400 is provided in the second gap, the filter portion 400 isolating the first filter unit 310 and the isolation portion 200 from each other, that is, the first filter unit 310 is isolated from the first isolation layer 210, the emission range of the first filter unit 310 does not increase due to the connection to the first isolation layer 210, resulting in color shift. It will be appreciated that the emission range of light emitted from the second opening 202 and the third opening 203 through the second filter unit 320 and the third filter unit 330 is defined by the first isolation layer 210 disposed on both sides, and the emission range of the first opening 201 through the first filter unit 310 is defined by the filter portion 400 and exit light of the first opening 201 has the same range as the exit light of the second opening 202 and the third opening 203, thus enhancing the display uniformity of the display panel.

In one embodiment, as shown in FIG. 7, the filter portion 400 is made of the same material as the second filter unit 320 and/or the third filter unit 330. The filter portion 400 is provided on both sides of the first filter unit 310, the filter portion 400 is made of the same material as the second filter unit 320, or the filter portion 400 is made of the same material as the third filter unit 330, or the filter portion 400 is made of the same material as the second filter unit 320 and the third filter unit 330, and the filter portion 400 may be formed by stacking the material of the second filter unit 320 and the material of the third filter unit 330. For example, red light may be transmitted through the first filter unit 310, and when the red light is transmitted to the filter portion 400, the filter portion 400 filters the red light to limit the red light emission range.

The filter portion 400 is set to be made of the same material as the second filter unit 320 and/or the third filter unit 330, that is, the filtering effect can be achieved, and the filter portion 400 can be patterned simultaneously with the second filter unit 320 and/or the third filter unit 330 at a time during manufacturing.

As shown in FIG. 1, in some embodiments, the light conversion units 500 include a red light conversion unit 510, a green light conversion unit 520, and a blue light conversion unit 530, where the red light conversion unit 510 is disposed on a side of the first filter unit 310 away from the supporting substrate 100, the green light conversion unit 520 is disposed on a side of the second filter unit 320 away from the supporting substrate 100, and the blue light conversion unit 530 is disposed on a side of the third filter unit 330 away from the supporting substrate 100.

In these embodiments, the red light conversion unit 510 emits red light under the excitation of light, the green light conversion unit 520 emits green light under the excitation of light, and the blue light conversion unit 530 is configured to transmit blue light, and the display panel can emit red light, green light and blue light. The first filter unit 310 is a red filter unit that screens the red light converted by the red conversion unit to improve the color purity of the red light. The second filter unit 320 is a green filter unit that screens the green light converted by the green conversion unit to improve the color purity of the green light. The third filter unit 330 is a blue filter unit that screens the blue light emitted by the blue light conversion unit 530 to improve the color purity of the blue light.

The orthographic projection of the red light conversion unit 510 on the supporting substrate 100 is within the orthographic projection range of the first filter unit 310 on the supporting substrate 100, which means that the orthographic area of the red light conversion unit 510 on the first filter unit 310 is less than or equal to the orthographic area of the first filter unit 310 on the supporting substrate 100. The orthographic projection of the green light conversion unit 520 on the supporting substrate 100 is within the orthographic projection range of the second filter unit 320 on the supporting substrate 100. The orthographic projection of the blue light conversion unit 530 on supporting substrate 100 is within the orthographic projection range of the third filter unit 330 on the supporting substrate 100. In some embodiments, the orthographic area of t the red light conversion unit 510 on the supporting substrate 100 may be greater than the orthographic area of the green light conversion unit 520 or the second filter unit 320 on the supporting substrate 100, and the orthographic area of the blue light conversion unit 530 on the supporting substrate 100 may also be greater than the orthographic area of the red light conversion unit 510 or the first filter unit 310 on the supporting substrate 100. In one embodiment, as shown in FIG. 2, a light-emitting substrate 700 is disposed on the side of the light conversion unit 500 away from the supporting substrate 100, the light-emitting substrate 700 being configured to emit fixed color light, where the red light conversion unit 510 is configured to emit red light under the excitation of fixed color light, the green light conversion unit 500 is configured to emit green light under the excitation of fixed color light, and the blue light conversion unit 530 is configured to emit blue light under the excitation of fixed color light.

In one embodiment, the fixed color light is blue light, and the blue light conversion unit 530 is made of a transparent material for transmitting blue light.

In one embodiment, as shown in FIG. 2, a light adjustment component and the light-emitting substrate 700 may be bonded by an adhesive layer 800. The adhesive layer 800 may fill a height difference between the light conversion unit 500 and the isolation portion 200 in the thickness direction X of the supporting substrate 100.

In one embodiment, the materials of the red light conversion unit 510 and the green light conversion unit 520 include quantum dot materials.

In some embodiments, the light-emitting substrate 700 includes light-emitting units arranged at intervals, an orthographic projection of each light-emitting unit on the supporting substrate 100 at least partially overlapping an orthographic projection of each light conversion unit 500 on the supporting substrate 100.

In these embodiments, each light-emitting unit is correspondingly arranged with each light conversion unit 500, and light emitted by the light-emitting unit is converted by the light conversion unit 500 and then enters a filter unit, which screens the light emitted by the light-emitting unit to improve color purity, thus enhancing the display effect of the display panel.

In one embodiment, the display panel further includes an adhesive layer 800 provided between the light-emitting substrate 700 and the light conversion layer and the light-shielding portion 540, the adhesive layer 800 being configured to connect the light-emitting substrate 700 and the light conversion layer and the light-shielding portion 540.

As shown in FIGS. 1 to 7, a further display panel according to an embodiment of the present application includes: a light-emitting substrate 700, a light conversion layer, an isolation portion 200, a light-shielding portion 540, and a filter layer 300, where the light conversion layer is disposed on one side of the light-emitting substrate 700, and the light conversion layer includes light conversion units 500 arranged at intervals; the isolation portion 200 is disposed on one side of the light-emitting substrate 700, the isolation portion 200 defines openings 240, and each light conversion unit 500 is located in each opening 240; the light-shielding portion 540 is disposed on a side of the isolation portion 200 facing the light-emitting substrate 700, and the light-shielding portion 540 also covers at least part of a side wall of the side of the light conversion unit 500 facing the isolation portion 200; the filter layer 300 includes a filter unit located in the opening 240, the filter unit being disposed on a side of the light conversion layer away from the light-emitting substrate 700; and the isolation portion 200 includes the same material as at least some of the filter units. In this embodiment, the isolation portion 200 defines the openings 240, and the filter layer 300 includes the filter units located in the openings 240 to transmit light in a certain wavelength range and block light in other wavelength ranges, thus achieving a filtering effect. The isolation portion 200 is made of the same material as at least some of the filter units, and the isolation portion 200 can have a filtering effect, achieving the effect of blocking light in a certain wavelength range. The isolation portion 200 is made of the same material as at least some of the filter units, and the isolation portion 200 can be formed simultaneously when the filter unit is formed, thereby simplifying the manufacturing process and improving the process performance of the display panel.

The light conversion layer includes light conversion units 500, where each light conversion unit 500 is disposed on the side of the filter unit away from the supporting substrate 100, and the light is converted into the light in a specific wavelength range by the light conversion units 500 and then emitted by the filter units.

The light-shielding portion 540 is configured to prevent the light converted by the light conversion unit 500 from being emitted toward the isolation portion 200, and more light is converted by the light conversion unit 500 and then emitted in the thickness direction X of the supporting substrate 100, which facilitates improvement of the utilization rate of the light. In addition, the light-shielding portion 540 is also configured to reduce light passing through the isolation portion 200 from the side of the isolation portion 200 away from the supporting substrate 100, thereby reducing light crosstalk.

In one embodiment, the light-emitting substrate 700, the light conversion layer, the isolation portion 200, the light-shielding portion 540, the filter layer 300, the encapsulation layer 600 and the adhesive layer 800 are arranged as above, which will not be repeated herein.

Figure 8:
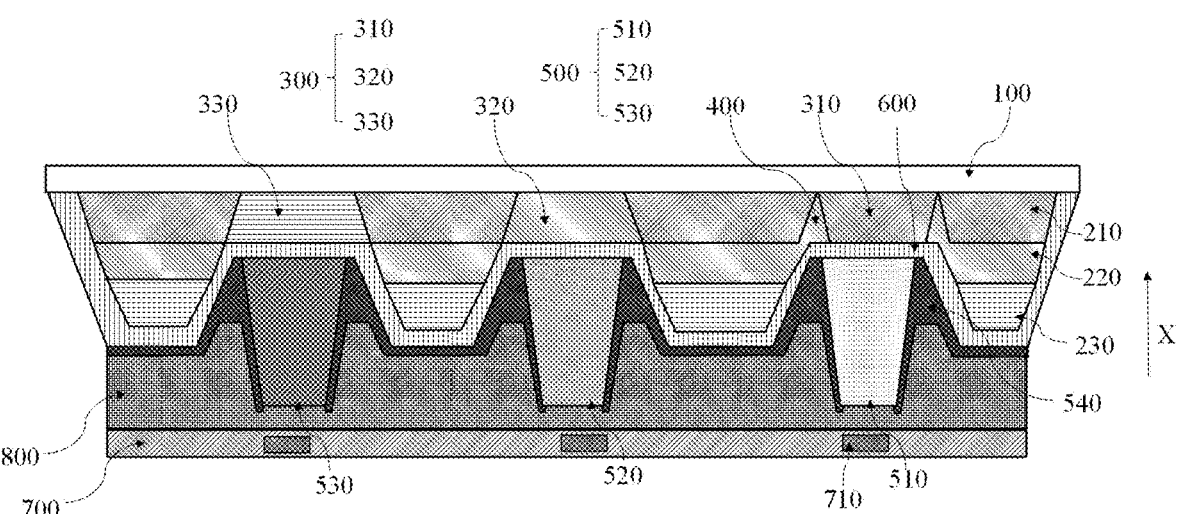
FIG. 8 is a structural schematic diagram of a further display panel according to an embodiment of the present application.

As shown in FIG. 8, an embodiment of the present application further provides a display device, including a display panel according to any one of the above-described embodiments. Since the display device according to the embodiment of the present application includes the display panel according to any one of the above-described embodiments the display device according to the embodiment in the embodiments of the present application has the beneficial effects of the display panel according to any one of the above-described embodiments, which will not be repeated herein.

The display device in the embodiment of the present application includes, but is not limited to devices having a display function, such as a cell phone, a personal digital assistant (PDA), a tablet computer, an e-book, a television, an access control, a smart fixed-line telephone, or a control console.

An embodiment of the present application further provides a method for manufacturing a display panel. As shown in FIG. 9, the method includes:

step S01: providing a supporting substrate 100;

step S02: as shown in FIG. 6, forming an isolation portion 200 and a filter layer 300 on one side of the supporting substrate 100, where the isolation portion 200 defines openings 240, and the filter layer 300 includes filter units disposed in the openings 240;

step S03: as shown in FIG. 10, preparing a light conversion layer on a side of the filter unit away from the supporting substrate 100, where the light conversion layer includes a light conversion unit 500 located in each of the openings 240, and an orthographic projection of the light conversion unit 500 on the supporting substrate 100 is less than an orthographic projection of the opening 240 on the supporting substrate 100; and step S04: as shown in FIG. 1, forming a light-shielding layer on a side of the isolation portion 200 away from the supporting substrate 100, patterning the light-shielding layer to form a light-shielding portion 540, where the light-shielding portion 540 covers the isolation portion 200 and a side of the light conversion unit 500 facing the isolation portion 200 and is filled between the light conversion unit 500 and the isolation portion 200.

In this embodiment, the isolation portion 200 defines the openings 240, and the filter layer 300 includes the filter units located in the openings 240 to transmit light in a certain wavelength range and block light in other wavelength ranges, thus achieving a filtering effect.

Each light conversion unit 500 is disposed on the side of the filter unit away from the supporting substrate 100, and the light is converted into light in a specific wavelength range by the light conversion unit 500 and then emitted by the filter unit.

The light-shielding portion 540 is configured to prevent the light converted by the light conversion unit 500 from being emitted toward the isolation portion 200, and more light is converted by the light conversion unit 500 and then emitted in the thickness direction X of the supporting substrate 100, thereby reducing light crosstalk and thus facilitating improvement of the utilization rate of light. In addition, the light-shielding portion 540 is also configured to reduce light passing through the isolation portion 200 from the side of the isolation portion 200 away from the supporting substrate 100, thereby improving the isolation effect of the isolation portion 200.

In one embodiment, the isolation portion 200 is made of the same material as at least some of the filter units, and the isolation portion 200 can have a filtering effect, achieving the effect of blocking light in a certain wavelength range. The isolation portion 200 is made of the same material as at least some of the filter units, and the isolation portion 200 can be formed simultaneously when the filter unit is formed, thereby simplifying the manufacturing process and improving the process performance of the display panel.

In some embodiments, as shown in FIG. 11, step S03 includes:

step S031: forming a light conversion layer on the side of the isolation portion 200 and the filter unit away from the supporting substrate 100; and step S032: patterning the light conversion layer, and retaining the light conversion layer located on the filter unit to form each of the light conversion units 500.

The light conversion units 500 include a first light conversion unit 510, a second light conversion unit 520, and a third light conversion unit 530.

The forming of the first light conversion unit 510 includes: forming a first light conversion layer on the side of the isolation portion 200 and the filter unit away from the supporting substrate 100, patterning the first light conversion layer, and retaining the first light conversion layer located on the first filter unit 310 to form the first light conversion unit 510.

The forming of the first light conversion unit 510 includes: a second light conversion layer is formed on the side of the isolation portion 200, the first light conversion unit 510 and the filter unit away from the supporting substrate 100, the second light conversion layer is patterned, and the second light conversion layer located on the second filter unit 320 is retained to form the second light conversion unit 520.

The forming of the third light conversion unit 510 includes: a third light conversion layer is formed on the side of the isolation portion 200, the first light conversion unit 510, the second light conversion unit 520 and the filter unit away from the supporting substrate 100, the third light conversion layer is patterned, and the third light conversion layer located on the third filter unit 330 is retained to form the third light conversion unit 530. In one embodiment, the first light conversion unit 510 is a red light conversion unit 510, the second light conversion unit 520 is a green light conversion unit 520, and the third light conversion unit 530 is a blue light conversion unit 510.

In these embodiments, the light conversion layer is patterned, and the light conversion layer located on the filter unit is retained to form each of the light conversion units 500. The light converted by the light conversion unit 500 directly enters the filter unit for screening the light, thus improving the display effect of the display panel.

Figure 13:
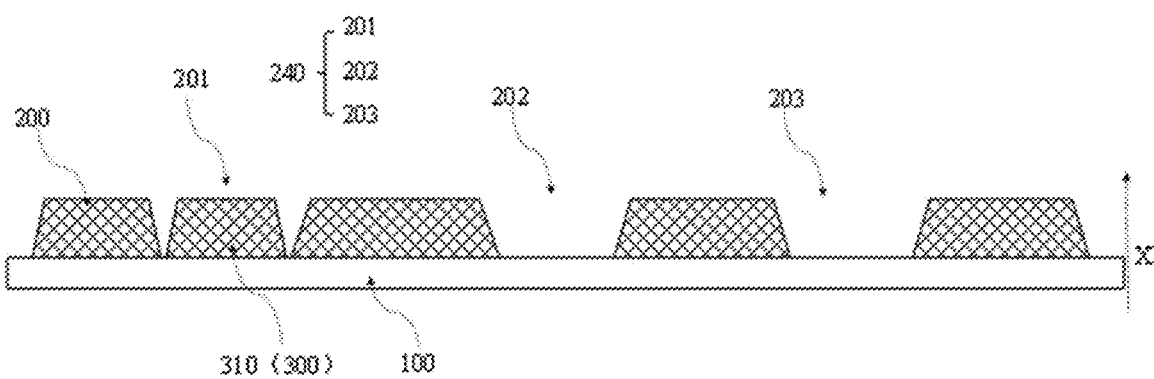
FIG. 13 is a structural schematic diagram of a further display panel according to an embodiment of the present application.
Figure 14:
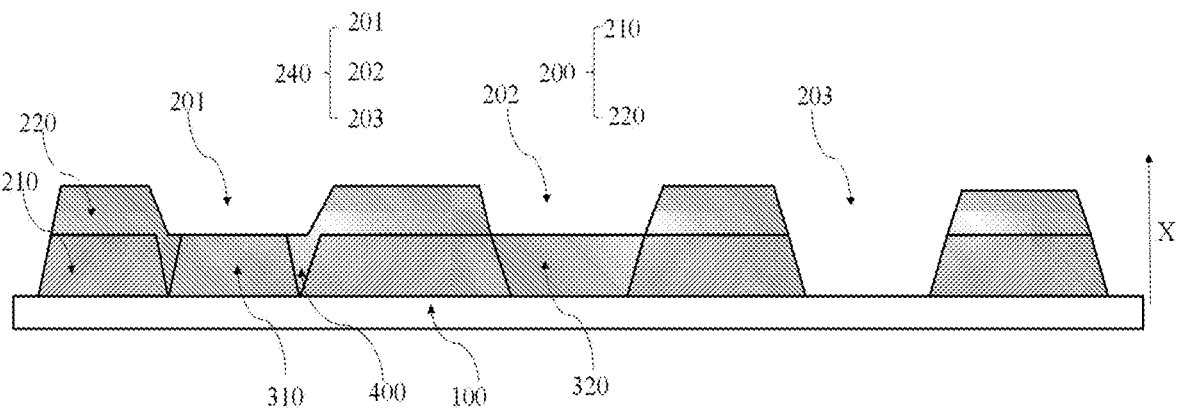
FIG. 14 is a structural schematic diagram of a further display panel according to an embodiment of the present application.
Figure 15:
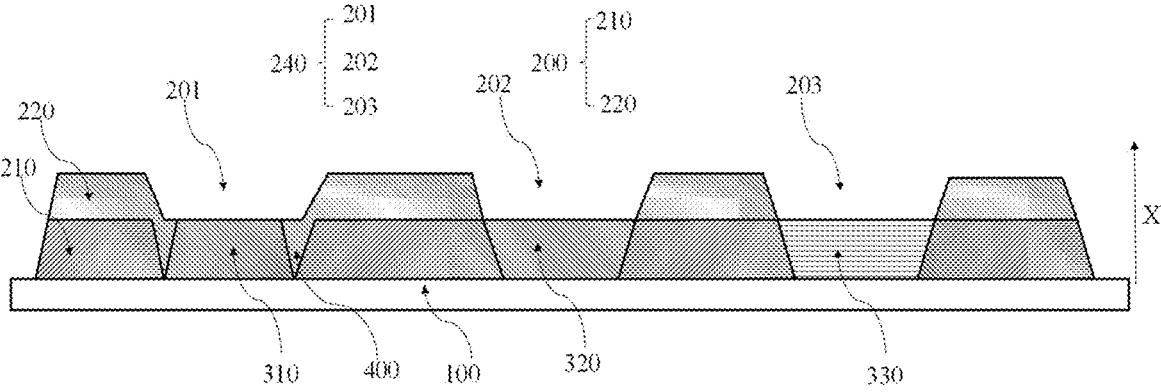
FIG. 15 is a structural schematic diagram of a further display panel according to an embodiment of the present application.

In some embodiments, as shown in FIG. 12, step S02 includes:

step S021: as shown in FIG. 13, a first filter material layer is disposed on one side of the supporting substrate 100, and the first filter material layer is patterned to form a first filter unit 310 and a first isolation layer 210;

step S022: as shown in FIG. 14, a second filter material layer is disposed on one side of the supporting substrate 100 and a side of the first isolation layer 210 away from the supporting substrate 100, and the second filter material layer is patterned to form a second filter unit 320, a second isolation layer 220, and a filter portion 400 disposed on a side of the first filter unit 310, the first isolation layer 210 and the second isolation layer 220 constituting the isolation portion 200; and step S023: as shown in FIG. 15, a third filter material layer is disposed on one side of the supporting substrate 100, and the third filter material layer is patterned to form a third filter unit 330.

In these embodiments, the first isolation layer 210 and the second isolation layer 220 constitute the isolation portion 200, the first filter material layer is disposed on one side of the supporting substrate 100, and the first filter material layer is patterned to form the first filter unit 310 and the first isolation layer 210. The first isolation layer 210 is made of the same material as the first filter unit 310, and the first isolation layer 210 and the first filter unit 310 can be obtained at the same time by a single patterning process. The second filter material layer is disposed on one side of the supporting substrate 100 and a side of the first isolation layer 210 away from the supporting substrate 100, the second filter material layer is patterned to form the second filter unit 320 and the second isolation layer 220, the second isolation layer 220 being made of the same material as the second filter unit 320, and the second isolation layer 220 and the second filter unit 320 can be obtained at the same time by a single patterning process. The first isolation layer 210 and the second isolation layer 220 are arranged in a stacked manner to form the isolation portion 200, and the isolation portion 200 can have a filtering range of the first filter material layer and the second filter material layer to achieve the effect of blocking light in a certain wavelength range. A third filter material layer is disposed on one side of the supporting substrate 100, and the third filter material layer is patterned to form the third filter unit 330. The first filter unit 310, the second filter unit 320 and the third filter unit 330 are formed on one side of the supporting substrate 100, and the display panel can achieve light output in three colors, and the combination of the three colors can form the display color of the display panel.

In one embodiment, step S023 further includes: as shown in FIG. 6, the third filter material layer is disposed on a side of the second isolation layer 220 away from the supporting substrate 100, and the third filter material layer is patterned to form a third isolation layer 230, the first isolation layer 210, the second isolation layer 220 and the third isolation layer 230 constituting the isolation portion 200.

The third filter material layer is patterned to form the third filter unit 330 and the third isolation layer 230, the third isolation layer 230 being made of the same material as the third filter unit 330, and the third isolation layer 230 and the third filter unit 330 can be obtained at the same time by a single patterning process. The first isolation layer 210, the second isolation layer 220 and the third isolation layer 230 constitute the isolation portion 200, and the isolation portion 200 can have a filtering range of the first filter material layer, the second filter material layer and the third filter material layer, to achieve the effect of blocking light in a certain wavelength range.

In one embodiment, as shown in FIG. 7, in step S021, a first filter material layer is disposed on one side of the supporting substrate 100, and the first filter material layer is patterned to form the first filter unit 310 and the first isolation layer 210, a second gap being formed between the first filter unit 310 and the first isolation layer 210. In step S022: the second filter material layer may also be deposited in the second gap to form the filter portion 400.

In one embodiment, as shown in FIG. 1, the light conversion layer and the supporting substrate 100, the filter layer 300, and the isolation portion 200 are combined to form the light adjustment component. The light conversion layer is disposed on the side of the filter layer 300 away from the supporting substrate 100, the filter layer 300 includes a light conversion unit 500, each light conversion unit 500 is formed on the side of each filter unit away from the supporting substrate 100, and the light conversion unit 500 converts light into a specific color and then the light is emitted to the filter unit. The light conversion layer and the supporting substrate 100, the filter layer 300, and the isolation portion 200 are combined to form the light adjustment component.

In one embodiment, the manufacturing method further includes: after step S02, an encapsulation layer 600 is formed on the side of the isolation portion 200 and each filter unit away from the supporting substrate 100.

In one embodiment, the manufacturing method further includes: as shown in FIG. 8, the light adjustment component is provided on the light-emitting substrate 700, and the light conversion layer is located on the side of the filter layer 300 facing the light-emitting substrate 700.

In these embodiments, the light adjustment component is attached to the light-emitting substrate 700, where the light conversion layer is located on the side of the filter layer 300 facing the light-emitting substrate 700, the light emitted by the light-emitting substrate 700 is converted into a specific color through the light conversion layer and then screened by the filter layer 300 for a characteristic wavelength and then emitted from the supporting substrate 100. The light adjustment component and the light-emitting substrate 700 may be bonded by the adhesive layer 800. In one embodiment, the adhesive layer 800 may fill the height difference between the light conversion unit 500 and the isolation portion 200.

Although the present application is described with reference to the embodiments, various modifications can be made, and equivalents can be provided to substitute for the components thereof without departing from the scope of the present application. In particular, the features mentioned in the embodiments can be combined in any manner, provided that there is no structural conflict. The present application is not limited to the specific embodiments disclosed herein but includes all the solutions that fall within the scope of the claims.

What is claimed is:

1. A display panel, comprising:
   a supporting substrate;
   an isolation portion disposed on one side of the supporting substrate, the isolation portion defining a plurality of openings;
   a filter layer comprising a plurality of filter units, each of the filter units located in each of the openings;
   a light conversion layer comprising a plurality of light conversion units, each of the light conversion units disposed in one of the openings and the light conversion units located on a side of the filter units away from the supporting substrate; and
   a light-shielding portion disposed on a side of the isolation portion away from the supporting substrate, the light-shielding portion further extending to cover at least part of a side wall of a side of the light conversion unit facing the isolation portion.

2. The display panel according to claim 1, wherein
   the isolation portion comprises the same material as at least some of the filter units; and
   a cross-sectional area of each of the light conversion units remains constant or gradually decreases in a direction away from the supporting substrate.

3. The display panel according to claim 1, wherein orthographic projections of each of the light conversion units and corresponding the opening on the supporting substrate at least partially overlap with each other, and the orthographic projection of at least one of the light conversion units on the supporting substrate is located within the orthographic projection of a corresponding one of the openings on the supporting substrate.

4. The display panel according to claim 1, wherein, in a direction perpendicular to a thickness direction of the supporting substrate, a first gap is provided between each of the light conversion units and the isolation portion, the light-shielding portion filling the first gap;
   wherein the light-shielding portion further covers an inner wall surface of a side of the isolation portion facing the light conversion units; and
   an encapsulation layer is provided between the light conversion layer and the filter layer.

5. The display panel according to claim 1, wherein a spacing between the side of the isolation portion away from the supporting substrate and the supporting substrate is greater than a spacing between the side of the filter unit away from the supporting substrate and the supporting substrate, and a spacing between a side of each of the light conversion units away from the supporting substrate and the supporting substrate is greater than the spacing between the side of the isolation portion away from the supporting substrate and the supporting substrate; and the light-shielding portion comprises a first segment and a second segment, the first segment being filled between the isolation portion and each of the light conversion units, the second segment being disposed on a side of the first segment away from the supporting substrate, and the second segment further covering at least part of the side wall of the side of each of the light conversion units facing the isolation portion.

6. The display panel according to claim 5, wherein a side of the second segment away from the supporting substrate is flush with the side of the light conversion units away from the supporting substrate.

7. The display panel according to claim 5, wherein an end of the second segment away from the supporting substrate partially overlaps an end of each of the light conversion units away from the filter unit.

8. The display panel according to claim 5, a portion of the second segment on the side of each of the light conversion units away from the supporting substrate has a smaller orthographic projection area on the supporting substrate than the side of each of the light conversion units away from the supporting substrate.

9. The display panel according to claim 1, wherein the openings comprise a first opening, a second opening and a third opening;

the filter units comprise a first filter unit, a second filter unit and a third filter unit, the first filter unit being disposed in the first opening, the second filter unit being disposed in the second opening, and the third filter unit being disposed in the third opening; and the isolation portion is made of the same material as at least one of the first filter unit, the second filter unit and the third filter unit.

10. The display panel according to claim 9, wherein the first filter unit, the second filter unit and the third filter unit have the same orthographic projection area on the supporting substrate.

11. The display panel according to claim 9, wherein the isolation portion comprises a first isolation layer and a second isolation layer arranged in a stacked manner, wherein the first isolation layer is made of the same material as one of the first filter unit, the second filter unit and the third filter unit, and the second isolation layer is made of the same material as one of the first filter unit, the second filter unit and the third filter unit; and the first isolation layer and the second isolation layer are made of different materials.

12. The display panel according to claim 11, wherein the isolation portion further comprises a third isolation layer, the first isolation layer, the second isolation layer and the third isolation layer being arranged in a stacked manner, the first isolation layer being made of the same material as the first filter unit, the second isolation layer being made of the same material as the second filter unit, and the third isolation layer being made of the same material as the third filter unit.

13. The display panel according to claim 12, wherein the first isolation layer, the second isolation layer and the third isolation layer are sequentially arranged in a direction away from the supporting substrate, the first filter unit has a second gap from an inner wall surface of the isolation portion facing the first opening, and a filter portion is disposed in the second gap; and at least a part of the filter portion is made of the same material as the second filter unit or the third filter unit.

14. The display panel according to claim 9, wherein the first filter unit is a red filter unit, the second filter unit is a green filter unit, and the third filter unit is a blue filter unit;

the light conversion units comprise a red light conversion unit, a green light conversion unit and a blue light conversion unit, the red light conversion unit being disposed on a side of the red filter unit away from the supporting substrate, the green light conversion unit being disposed on a side of the second filter unit away from the supporting substrate, and the blue light conversion unit being disposed on a side of the third filter unit away from the supporting substrate;

a light-emitting substrate is provided on a side of the light conversion units away from the supporting substrate, the light-emitting substrate being configured to emit fixed color light, wherein the red light conversion unit is configured to emit red light under the excitation of the fixed color light, the green light conversion unit is configured to emit green light under the excitation of the fixed color light, and the blue light conversion unit is configured to emit blue light under the excitation of the fixed color light; and the materials of the red light conversion unit and the green light conversion unit comprise quantum dot materials.

15. The display panel according to claim 14, the fixed color light is blue light, and the blue light conversion unit is made of a transparent material for transmitting the blue light.

16. The display panel according to claim 14, wherein a light-emitting substrate is provided on a side of the light conversion units away from the supporting substrate, the light-emitting substrate being configured to emit fixed color light, wherein the red light conversion unit is configured to emit red light under the excitation of the fixed color light, the green light conversion unit is configured to emit green light under the excitation of the fixed color light, and the blue light conversion unit is configured to emit blue light under the excitation of the fixed color light.

17. The display panel according to claim 14, wherein the light-emitting substrate comprises a plurality of light-emitting units arranged at intervals, an orthographic projection of each of the light-emitting units on the supporting substrate at least partially overlapping an orthographic projection of each of the light conversion units on the supporting substrate; and the display panel further comprises an adhesive layer provided between the light-emitting substrate and the light conversion layer.

18. A display device, comprising:

a display panel, comprising:

a supporting substrate;

an isolation portion disposed on one side of the supporting substrate, the isolation portion defining a plurality of openings;

a filter layer comprising a plurality of filter units, each of the filter units located in each of the openings;

a light conversion layer comprising a plurality of light conversion units, each of the light conversion units disposed in one of the openings and the light conversion units located on a side of the filter units away from the supporting substrate; and a light-shielding portion disposed on a side of the isolation portion away from the supporting substrate, the light-shielding portion further extending to cover at least part of a side wall of a side of the light conversion unit facing the isolation portion.

19. A method for manufacturing a display panel, comprising:

providing a supporting substrate;

forming an isolation portion and a filter layer on one side of the supporting substrate, wherein the isolation portion defines a plurality of openings, and the filter layer comprises a plurality of filter units, each of the filter units disposed in each of the openings;

preparing a light conversion layer on a side of the filter units away from the supporting substrate, wherein the light conversion layer comprises a plurality of light conversion units, each of the light conversion units located in each of the openings, and an orthographic projection of each of the light conversion units on the supporting substrate is less than an orthographic projection of each of the openings on the supporting substrate; and forming a light-shielding layer on a side of the isolation portion away from the supporting substrate, and patterning the light-shielding layer to form a light-shielding portion, the light-shielding portion covering the isolation portion and a side of the light conversion unit facing the isolation portion, and being filled between each of the light conversion units and the isolation portion.

20. The manufacturing method according to claim 19, wherein the step of preparing a light conversion layer on a side of the filter layer away from the supporting substrate comprises:

forming a light conversion layer on the side of the isolation portion and the filter units away from the supporting substrate;

patterning the light conversion layer, and retaining the light conversion layer located on the filter units to form each of the light conversion units; and the step of forming an isolation portion and a filter layer on one side of the supporting substrate, in which the isolation portion defines a plurality of openings and the filter layer comprises a plurality of filter units disposed in the openings, comprises: providing a first filter material layer on one side of the supporting substrate, and patterning the first filter material layer to form the first filter unit and a first isolation layer;

providing a second filter material layer on one side of the supporting substrate and a side of the first isolation layer away from the supporting substrate, and patterning the second filter material layer to form the second filter unit and a second isolation layer, the first isolation layer and the second isolation layer constituting the isolation portion; providing a third filter material layer on a side of the second isolation layer away from the supporting substrate, and patterning the third filter material layer to form a third isolation layer, the first isolation layer, the second isolation layer and the third isolation layer forming the isolation portion.

* * * * *